United States Patent
Kim et al.

(10) Patent No.: US 9,876,591 B2
(45) Date of Patent: Jan. 23, 2018

(54) TRANSCEIVER AND OPERATION METHOD THEREOF

(71) Applicant: Samsung Electronics Co., Ltd., Gyeonggi-do (KR)

(72) Inventors: Hui-Jung Kim, Gyeonggi-do (KR); Hyeong-Seok Jeong, Gyeonggi-do (KR); Soo-Yong Kim, Gyeonggi-do (KR); Jeong-Yeol Bae, Gyeonggi-do (KR); Dong-Han Lee, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 149 days.

(21) Appl. No.: 14/848,899

(22) Filed: Sep. 9, 2015

(65) Prior Publication Data

US 2016/0080096 A1 Mar. 17, 2016

(30) Foreign Application Priority Data

Sep. 12, 2014 (KR) ........................ 10-2014-0121225

(51) Int. Cl.
*H04B 17/318* (2015.01)
*H04W 4/00* (2009.01)
*H04W 52/02* (2009.01)

(52) U.S. Cl.
CPC .......... *H04B 17/318* (2015.01); *H04W 4/008* (2013.01); *H04W 52/0209* (2013.01); *Y02B 60/50* (2013.01)

(58) Field of Classification Search
CPC ............................ H04B 17/318; H04W 4/008; H04W 52/0209; Y02B 60/50

(Continued)

(56) References Cited

U.S. PATENT DOCUMENTS

| 8,369,782 B1 | 2/2013 | Lin et al. |
| 8,467,326 B2 | 6/2013 | Deprun |

(Continued)

FOREIGN PATENT DOCUMENTS

| JP | 4154262 | 9/2008 |
| KR | 10-2004-0060459 | 7/2004 |

(Continued)

OTHER PUBLICATIONS

Jia-Yi Chen et al., A Fully Integrated Auto-Calibrated Super-Regenerative Receiver in 0.13-um CMOS, IEEE Journal of Solid-State Circuits, V vol. 42, No. 9, Sep. 2007, pp. 1976-1985.

(Continued)

*Primary Examiner* — Obaidul Huq
(74) *Attorney, Agent, or Firm* — The Farrell Law Firm, P.C.

(57) ABSTRACT

A transceiver and a method operating the transceiver are provided. The transceiver includes a first communication module configured to receive a first signal based on a first communication scheme; a second communication module configured to receive a second signal based on a second communication scheme; a reception module having a low-power circuit configured to detect a signal in a frequency band which can be used by the first communication module and the second communication module; and a controller configured to establish channels for the first communication module or the second communication module based on a strength of the signal detected by the reception module.

20 Claims, 13 Drawing Sheets

(58) Field of Classification Search
USPC .................................... 370/310, 328, 338
See application file for complete search history.

(56) References Cited

U.S. PATENT DOCUMENTS

| | | | |
|---|---|---|---|
| 2007/0197256 A1* | 8/2007 | Lu | H04B 1/406 |
| | | | 455/552.1 |
| 2008/0051049 A1* | 2/2008 | Katoh | H04N 5/44 |
| | | | 455/205 |
| 2008/0137566 A1 | 6/2008 | Marholev et al. | |
| 2008/0181155 A1 | 7/2008 | Sherman et al. | |
| 2010/0118695 A1 | 5/2010 | Shellhammer et al. | |
| 2013/0107988 A1 | 5/2013 | Park et al. | |
| 2013/0170588 A1 | 7/2013 | Park et al. | |
| 2014/0084858 A1 | 3/2014 | Kim et al. | |
| 2014/0274174 A1* | 9/2014 | Sekiya | H04W 72/082 |
| | | | 455/500 |

FOREIGN PATENT DOCUMENTS

| | | |
|---|---|---|
| KR | 10-2005-0037696 | 4/2005 |
| KR | 10-2013-0080227 | 7/2013 |
| KR | 10-1283673 | 7/2013 |
| KR | 10-2014-0034493 | 3/2014 |

OTHER PUBLICATIONS

F. Xavier Moncunill-Geniz et al., A 2.4-GHz DSSS Superregenerative Receiver With a Simple Delay-Locked Loop, IEEE Microwave and Wireless Components Letters, vol. 15, No. 8, Aug. 2005, pp. 499-501.

James S. Ayers, Ultra-Low Power Receivers for Wireless Sensor Networks, A Dissertation submitted to Oregon State University, May 5, 2010.

* cited by examiner

| Configuration | Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5ms  | D | S | U | U | U | D | S | U | U | U |
| 1 | 5ms  | D | S | U | U | D | D | S | U | U | D |
| 2 | 5ms  | D | S | U | D | D | D | S | U | D | D |
| 3 | 10ms | D | S | U | U | U | D | D | D | D | D |
| 4 | 10ms | D | S | U | U | D | D | D | D | D | D |
| 5 | 10ms | D | S | U | D | D | D | D | D | D | D |
| 6 | 5ms  | D | S | U | U | U | D | S | U | U | D |

FIG.11C

TRANSCEIVER AND OPERATION METHOD THEREOF

PRIORITY

This application claims priority under 35 U.S.C. §119(a) to a Korean Patent Application filed on Sep. 12, 2014 in the Korean Intellectual Property Office and assigned Serial No. 10-2014-0121225, the entire contents of which are incorporated herein by reference.

BACKGROUND

1. Field of the Disclosure

The present disclosure relates generally to a transceiver including a receiver having a low energy structure and an operation method thereof, and more particularly, to an apparatus and a method for controlling an on/off operation of a reception module of a Wireless Fidelity (WiFi) communication scheme and a Bluetooth (BT) communication scheme using an Industrial Scientific Medical (ISM) band by monitoring signal strength of the ISM band through a low-power detector.

2. Description of the Related Art

Mobile devices such as most smart phones include an Institute of Electronics and Electrical Engineers (IEEE) standard 802.11 (IEEE 802.11) wireless Local Area Network (LAN) (or WiFi) communication type module (hereinafter, referred to as a WiFi communication module) and a BT (or IEEE 802.15.4 ZigBee) communication type module (hereinafter, referred to as a BT communication module) in order to support wireless Internet functions, Bluetooth earphones, and Bluetooth hands free functions. Further, the mobile device may further include a mobile communication modem of Global System for Mobile communications (GSM) or Wideband Code Division Multiple Access (WCDMA), or Long Term Evolution (LTE) communication scheme.

In general, power consumed by a mobile device in a mobile communication network is a significant issue which should be considered due to the limitation of a portable battery. For this reason, most mobile communication network standards define an idle mode and a sleep mode to reduce power consumed by a mobile device.

In addition, a WiFi communication module and a BT communication module are enabled or disabled manually by a user's request, and thus it is difficult to efficiently manage power consumption thereof.

For example, in a state where a WiFi communication module is disabled, when the user does not recognize that an Access Point (AP) in a particular region broadcasts an advertisement message, the user cannot receive the specified advertisement message. However, when a WiFi communication module or a BT communication module is not disabled by the user after a mobile device enables the WiFi communication module or the BT communication module by a user's request to provide a service to the user, the WiFi communication module or the BT communication module consumes battery power while remaining in the enabled state.

Further, since a WiFi communication module and a BT communication module are based on a high-power Radio Frequency (RF) structure, there is a limitation in reducing power consumption.

Furthermore, a WiFi communication scheme and a BT communication scheme may use an Industrial Scientific Medical (ISM) band (for example, 2.4 to 2.5 GHz) and may cause interference to other communication schemes (for example, $3^{rd}$ Generation Partnership Project (3GPP) Time Division Duplex (TDD) and Frequency Division Duplex (FDD)) using a band adjacent to the ISM band. Therefore, it is necessary to perform channel establishment to minimize interference with other communication schemes.

SUMMARY

The present disclosure has been made to address the above-mentioned problems and disadvantages, and to provide at least the advantages described below.

Accordingly, as aspect of the present disclosure provides an apparatus and a method for controlling an on/off operation of a reception module of a WiFi communication scheme and a BT communication scheme using an ISM band by monitoring signal strength of the ISM band through a low-power detector.

Another aspect of the present disclosure provides an apparatus and a method for controlling channel establishment of a reception module of a WiFi communication scheme and a BT communication scheme using an ISM band by monitoring signal strength of the ISM band through a low-power detector.

Another aspect of the present disclosure provides an apparatus and a method for reducing the sizes of a low-power detector and a reception device including a WiFi communication module and a BT communication module.

BRIEF DESCRIPTION OF THE DRAWINGS

The above and other aspects, features and advantages of the present disclosure will be more apparent from the following detailed description, taken in conjunction with the accompanying drawings, in which:

FIG. 11C is a chart of an LTE TDD configuration according to an embodiment of the present disclosure.

DETAILED DESCRIPTION OF EMBODIMENTS OF THE PRESENT DISCLOSURE

Hereinafter, various embodiments of the present disclosure are described in detail with reference to the accompanying drawings. Further, in the following description of the present disclosure, a detailed description of known functions and configurations incorporated herein are omitted when it may make the subject matter of the present disclosure rather unclear. The terms which are described below are terms defined in consideration of the functions in the present disclosure, and may be different according to users, intentions of the users, or customs. Therefore, the definitions of the terms should be determined based on the contents throughout the present disclosure.

Each embodiment of the present disclosure describes a transceiver including a receiver having a low-power structure and an operation method thereof.

Figure 1:
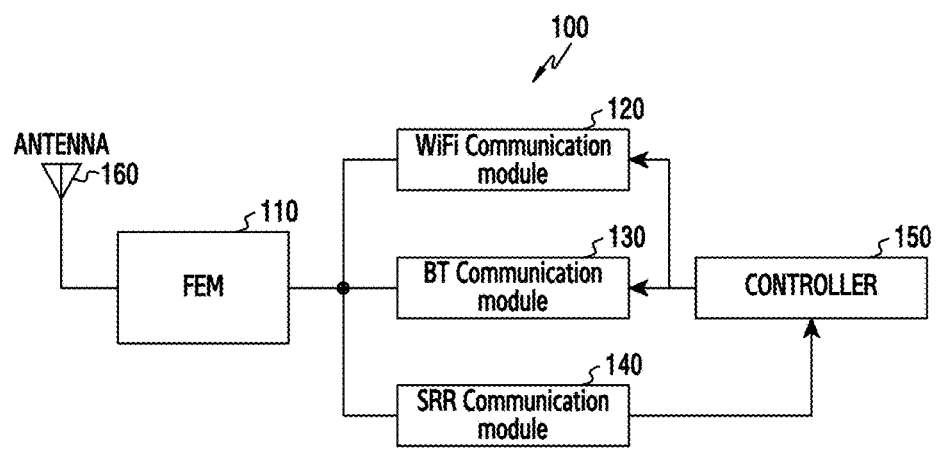
FIG. 1 is a transceiver including a plurality of communication modules according to an embodiment of the present disclosure.

FIG. 1 is a transceiver according to an embodiment of the present disclosure.

Referring to FIG. 1, the transceiver 100 includes a Front End Module (FEM) 110, a WiFi communication module 120, a BT communication module 130, a Super Regenerative Receiver (SRR) communication module 140, and a controller 150.

The FEM 110 connects an antenna 160 to an RF Integrated Circuit (RFIC) (for example, the WiFi communication module 120, the BT communication module 130, and the SRR communication module 140) and separate WiFi and/or BT transmission/reception signals in an ISM band. Further, the FEM 110 may be a module in which an RF switch, a filter for reception (for example, a Surface Acoustic Wave (SAW) filter), and a Power Amplifier (PA) for transmission are integrated, and may serve to perform filtering and amplification. The FEM 110 may be divided into a reception FEM including a received signal filter therein and a transmission FEM including a PA for amplifying a transmitted signal therein.

According to an embodiment of the present invention, the FEM 110 may further include a Low Noise Amplifier (LNA). Alternatively, the LNA may exist as a separate module between the FEM 110 and an RFIC. The LNA serves to amplify an RF signal to meet a minimum noise index of a received signal.

The WiFi communication module 120 down-converts a WiFi signal into an Intermediate Frequency (W) signal or a baseband signal or up-converts an IF signal or a baseband signal into a WiFi signal.

The BT communication module 120 down-converts a BT signal into an IF signal or a baseband signal or up-converts an IF signal or a baseband signal into a BT signal.

In addition, various sensor devices installed in a wireless sensor network and a short-range communication network are required to be small, to consume a low level of power, and to have a low level of complexity. A general super heterodyne RF structure may improve the performance such as sensitivity by using an intermediate frequency band without directly converting a high frequency band into a baseband. However, for this reason, complexity, cost, and power consumption may increase.

Particularly, a modem technology having a super heterodyne RF structure consumes a very high level of power in an RF component as compared to a digital baseband component. For example, in a case of a modem chip for low-power Wireline Packet Data Network (WPAN) (IEEE 802.15.4), a component for processing a digital signal requires approximately 0.5 mW in both transmission and reception. A component for processing an analog signal consumes approximately 21 mW in a reception mode and approximately 30 mW in a transmission mode, which indicates relatively higher power consumption (about 40 to 60 times) as compared to a component for processing a digital signal.

For this reason, an SRR having a simple RF structure using a small number of active elements is currently a hot topic.

According to an embodiment of the present disclosure, the SRR communication module 140 amplifies an output signal to detect the signal by using a positive feedback structure for signals in an ISM band and a band adjacent to the ISM band used by a WiFi communication scheme and a BT communication scheme.

Further, a non-coherent modulation technology may be used for consuming a low level of power and to have a low level of complexity. For example, a modulation scheme such as non-coherent On-Off Keying (OOK) or non-coherent Frequency Shift Keying (FSK) detects a signal by using an envelope detector.

Such non-coherent modulation/demodulation technologies exhibit lower performance as compared to coherent modulation/demodulation technologies, but do not require a high cost synchronization process for accurately calculating a carrier phase value.

Further, non-coherent modulation/demodulation technologies do not use a component requiring a high level of power such as a mixer or a linear amplifier necessary in an In-phase/Quadrature-phase (I/Q) structure. Accordingly, the non-coherent modulation/demodulation technologies can save power and reduce circuit complexity.

Particularly, an RF receiver for super low-power transmission/reception may adopt a low-power and low-complexity modulation technology such as non-coherent OOK.

The controller 150 determines whether to turn on or off an operation of the WiFi communication module 120 or the BT communication module 130 based on a signal strength detected in the ISM band by the SRR communication module 140 and the signal strength detected in the frequency band.

Further, the controller 150 establishes a channel for receiving a signal through the WiFi communication module 120 or the BT communication module 130 based on a signal strength detected in the ISM band by the SRR communication module 140.

Further, according to an embodiment of the present disclosure, the WiFi communication module 120 and the SRR communication module 140 may operate in a TDD scheme, the BT communication module 130 and the SRR communication module 140 may simultaneously operate in the TDD scheme, or the WiFi communication module 120, the BT communication module 130, and the SRR communication module 140 may simultaneously operate in the TDD scheme. Alternatively, only the SRR communication module 140 may operate.

Figure 2:
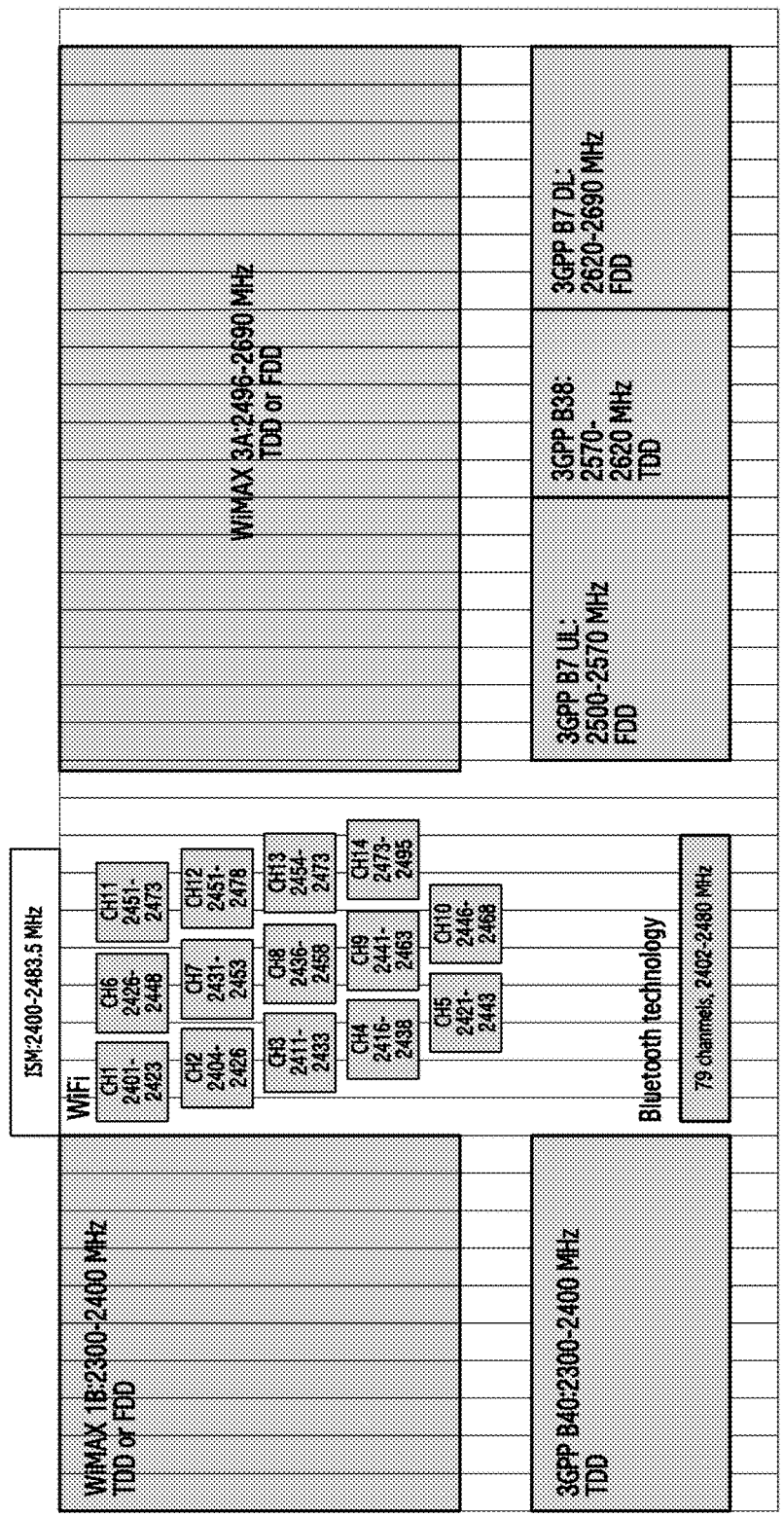
FIG. 2 illustrates an allocation of an ISM band and bands adjacent to the ISM band according to an embodiment of the present disclosure.

FIG. 2 illustrates allocation of an ISM band and bands adjacent to the ISM band according to an embodiment of the present disclosure.

Referring to FIG. 2, an ISM band corresponds to a frequency band which can be used by industrial/scientific/ medical devices without approval for use, and bands of 900 MHz, 2.4 GHz, and 5.7 GHz are globally established as common ISM bands. Particularly, the ISM band such as 2400 MHz to 2483.5 MHz is allocated and used for WiFi communication and BT communication. Within the band of 2400 MHz to 2483.5 MHz, WiFi communication channels are divided into 14 channels and BT communication channels are divided into 79 channels.

In addition, the ISM band and bands adjacent to the ISM band, for example, 2300 MHz to 2400 MHz or 2500 MHz to 2690 MHz are allocated for Worldwide interoperability for Microwave Access (WiMAX), 3GPP TDD, or FDD communication. 2300 MHz to 2400 MHz is referred to as a first band adjacent to the ISM band and 2500 MHz to 2690 MHz is referred to as a second band adjacent to the ISM band.

In general, it is rare to simultaneously use the first band and second band adjacent to the ISM band, and only one of the first band and second band adjacent to the ISM band is used in any country.

Figure 3:
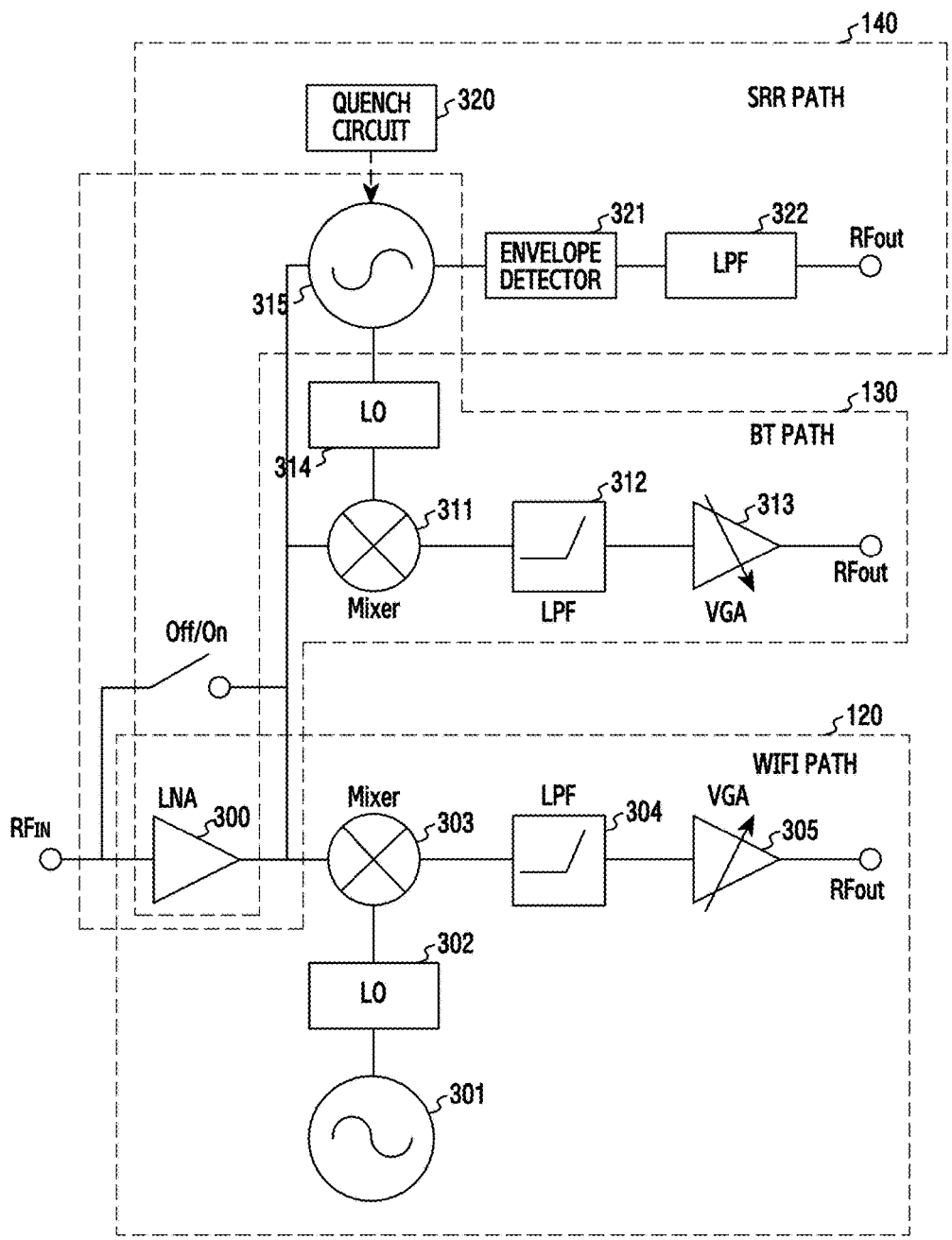
FIG. 3 is a block diagram of reception paths of a transceiver according to an embodiment of the present disclosure.

FIG. 3 is a block diagram of reception paths in the transceiver 100 of FIG. 1 according to an embodiment of the present disclosure.

Referring to FIG. 3, a WiFi reception path of the WiFi communication module 120 includes an LNA 300 for amplifying a signal to meet a minimum noise index of a received signal, a mixer 303 for converting an RF signal into an IF signal or a baseband signal, a Voltage Controlled Oscillator (VCO) 301 connected to a local oscillator 302 for outputting an oscillation frequency controlled through a voltage applied to an input to the mixer 303, a Low Pass Filter (LPF) 304, and a Variable Gain Amplifier (VGA) 305. A BT reception path 130 includes the LAN 300, a mixer 311, a local oscillator 314, a VCO 315, an LPF 312, and a VGA 313. The SRR reception path 140 includes the LAN 300, the VCO 315, a quench circuit 320, an envelope detector 321, and an LPF 322.

In order to reduce the size of a reception path, the LNA 300 may be shared and used by the WiFi reception path 120, the BT reception path 130, and the SRR reception path 140. According to an embodiment of the present disclosure, the reception paths may have different LANs, respectively.

According to an embodiment of the present disclosure, the LAN 300 may be omitted in the SRR reception path 140.

Further, in order to reduce the size of a reception path, the VCO 315 and the local oscillator 314 of the BT reception path 130 may be shared and used by the SRR reception path 140.

According to an embodiment of the present disclosure, the VCO 301 and the local oscillator 302 of the WiFi reception path 120 may be shared and used by the SRR reception path 140.

In an operation of the SRR reception path 140, an RF signal having passed through the LNA 300 passes through the VCO 315. In addition, the VCO 315 may amplify an RF signal corresponding to a certain frequency by a positive feedback loop.

However, if the amplification is continuously performed, oscillation occurs. Accordingly, an operation for stopping the oscillation is required. The quench circuit 320 controls periodical occurrence and extinction of an oscillation.

For example, when a non-coherent OOK modulation scheme is used, if a transmission path transmits a signal corresponding to a transmission symbol "1," the VCO 315 generates a relatively large oscillation signal controlled by the quench circuit 320 in response to the signal.

However, when a transmission path transmits a signal corresponding to a transmission symbol "0," the VCO 315 does not ideally oscillate, but may practically generate a weak oscillation signal by noise.

Such oscillation signals may be provided as input signals to the envelope detector 321. When the signals pass through the envelope detector 321, an envelope of the generated high frequency oscillation signals may be detected as an output. The LPF 322 may allow the envelope to pass through a certain band.

According to an embodiment of the present disclosure, since the output signal of the envelope detector 321 is a very week signal, large amplification is required to detect the signal in a digital baseband. Further, since the output signal of the envelope detector 321 is required to control a strength of the amplification according to a distance between a transmitter and a receiver, the LPF 322 may be replaced by a Variable Gain Amplifier (VGA) and an Analog-to-Digital Converter (ADC) for performing amplification by controlling the strength of the amplification.

According to an embodiment of the present invention, in the SRR reception path 140, the envelope detector 321 and the LPF 322 may be replaced by a rectifier, a comparator, and a Digital-to-Analog Converter (DAC).

Figure 4:
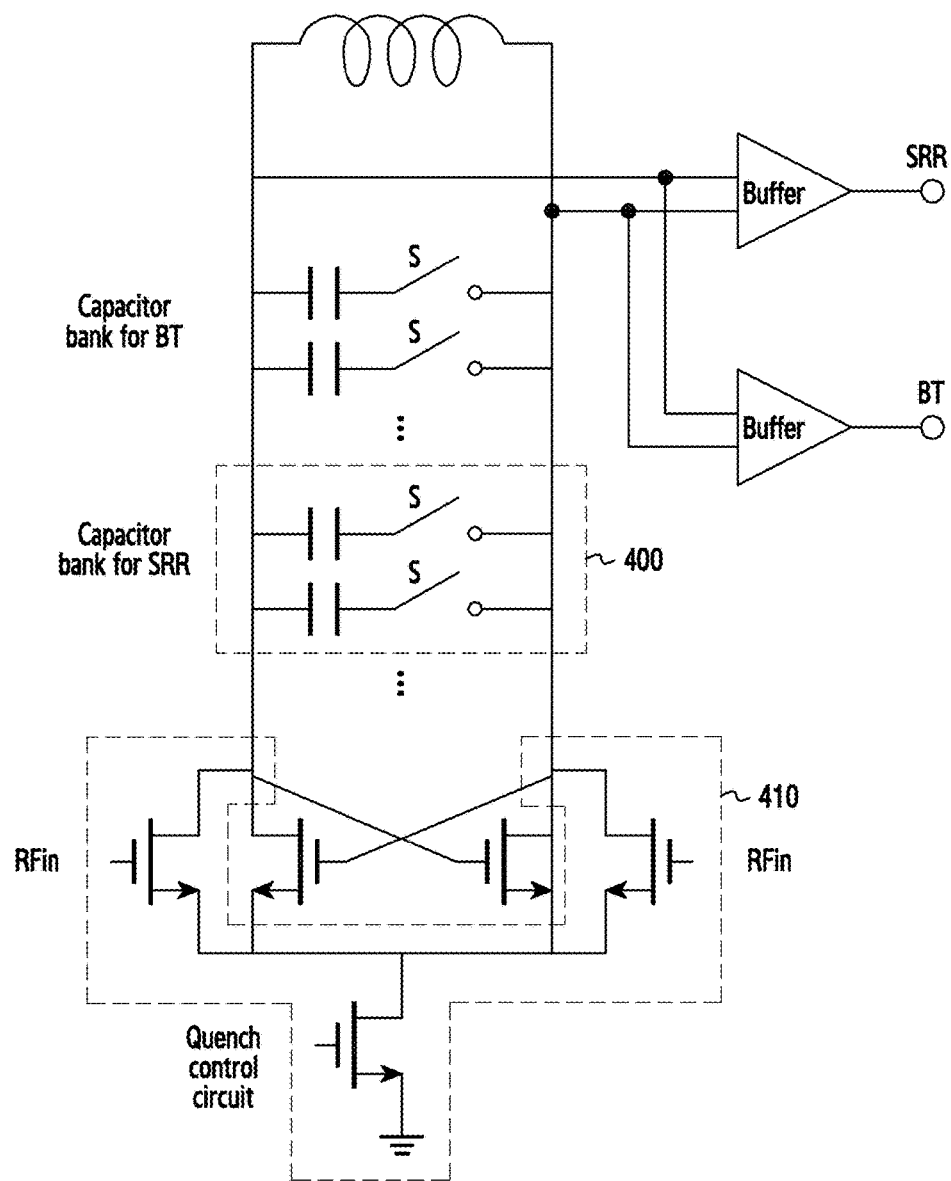
FIG. 4 is a Voltage Controlled Oscillator (VCO) shared between a Super Regenerative Receiver (SRR) reception path and a BT reception path of FIG. 3 according to an embodiment of the present disclosure.

FIG. 4 is a VCO 315 of FIG. 3 according to an embodiment of the present disclosure.

Referring to FIG. 4, the VCO 315 includes a negative transconductance (gm) cell including an inductor and capacitor (LC) element, and two n-channel Metal Oxide Semiconductor Field Effect Transistors (n-MOSFETs) which are symmetrical to each other. An oscillation frequency is output by oscillation due to the LC element, and the oscillation frequency may be controlled by a capacitor bank (e.g. capacitor plus switch). For example, a change in capacitance generated according to an on/off state of a switch of a capacitor bank controls an oscillation frequency. Since an amplitude of an oscillation frequency becomes smaller due to parasitic resistance components on the LC element, the negative transconductance (gm) cell supplies energy required for the oscillation in order to remove the parasitic resistance components. The negative transconductance (gm) cell includes two n-MOSFETs which are symmetrically connected to each other.

According to an embodiment of the present disclosure, in addition to a capacitor bank for a BT receiver, a capacitor bank 400 for an SRR may be further included to allow the SRR and the BT receiver to share the VCO. Further, a quench control circuit 410 (which is the same as the quench circuit 320 of FIG. 3) may be connected to the negative transconductance (gm) cell.

Outputs of the VCO may be provided to the SRR reception path and the BT reception path via buffers (SRR and BT), respectively. Since signal sizes of the outputs of the VCO are too small to be directly used for the BT reception path or the SRR reception path, the buffers may amplify the signal sizes.

Figure 5A:
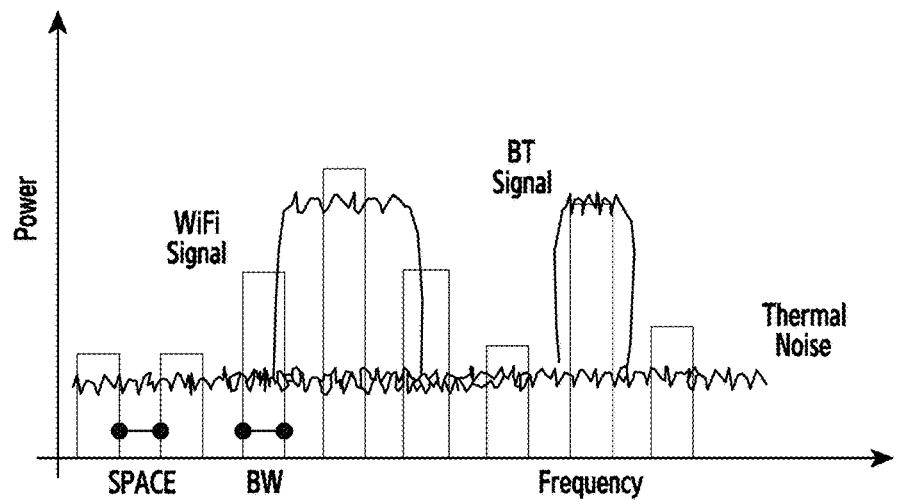
FIGS. 5A and 5B are graphs of a bandwidth (BW) and space for signal detection in an ISM band according to an embodiment of the present disclosure.
Figure 5B:
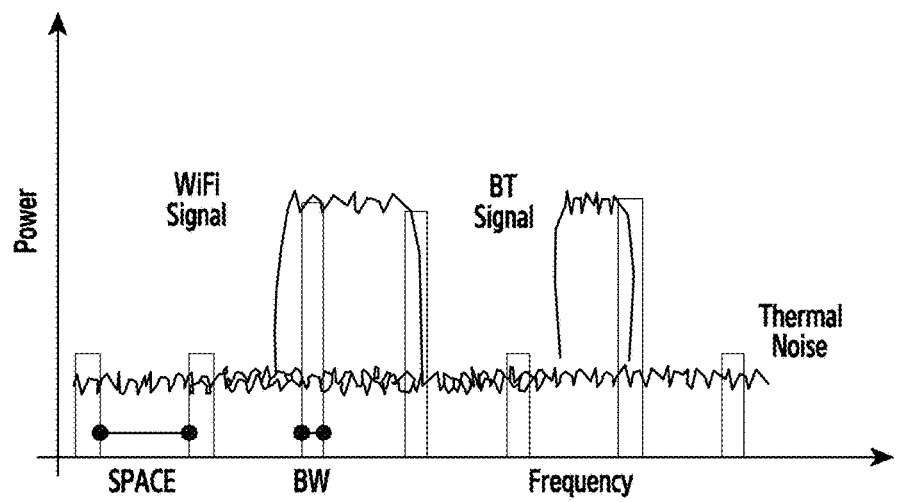

FIGS. 5A and 5B are graphs of a bandwidth (BW) and a space for detecting a signal in an ISM band according to an embodiment of the present disclosure.

FIG. 5A illustrates a case where a channel bandwidth interval is narrow and a channel band is wide to detect a WiFi or BT signal in an ISM band, and FIG. 5B illustrates a case where a channel bandwidth interval is wide and a channel bandwidth is narrow to detect a WiFi or BT signal in an ISM band.

In general, the accuracy is higher and a channel scan time is longer as the channel bandwidth interval and the channel bandwidth become narrower, and the accuracy is lower but the channel scan time is shorter as the channel bandwidth interval and the channel bandwidth become wider. For example, when the channel bandwidth interval and the channel bandwidth are narrow, the accuracy is higher but the channel scan time is very long. When the channel bandwidth interval is narrow and the channel bandwidth is wide or when the channel bandwidth interval is wide and the channel bandwidth is narrow, the accuracy is intermediate and the channel scan time is long. When the channel bandwidth interval is wide and the channel bandwidth is wide, the accuracy is very low but the channel scan time is short.

Figure 6:
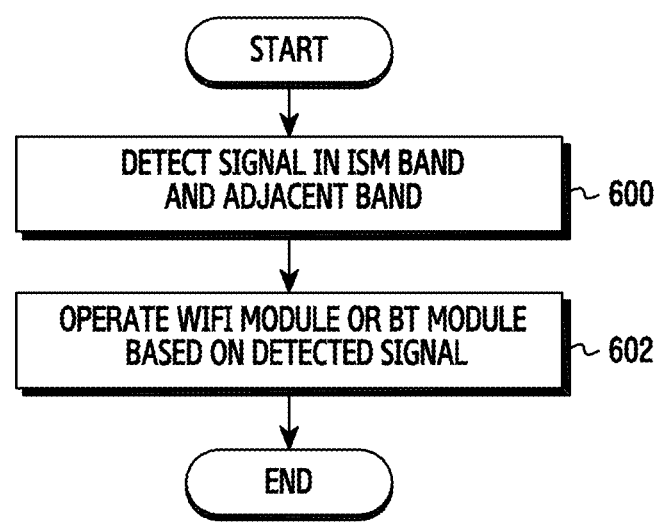
FIG. 6 is a flowchart of a method of a reception device according to an embodiment of the present disclosure.

FIG. 6 is a flowchart of a method of a reception device according to an embodiment of the present disclosure.

Referring to FIG. 6, the SRR communication module 140 detects signals in an ISM band and adjacent bands through the reception path (for example, a path that includes the LNA 300, the VCO 315, the quench circuit 320, the envelope detector 321, and the LPF 322) in step 600. For example, according to a predefined channel bandwidth and channel bandwidth interval mentioned in FIGS. 5A and 5B, a signal strength in the channel band may be successively detected.

The controller 150 enables the WiFi communication module 120 or the BT communication module 130 based on the signal detected in the ISM band in step 602.

For example, when a signal is detected from at least one of 14 WiFi channels in the ISM band, the controller 150 connects the corresponding channel through an Access Point (AP) by activating the WiFi communication module 120.

Alternatively, when a signal is detected through a BT advertising channel in the ISM band, the controller 150 receives the signal through the corresponding advertising channel by activating the BT communication module 130 (see FIG. 10 below).

According to an embodiment of the present disclosure, when an OOK modulation signal indicating an operation of the WiFi communication module 120 or the BT communication module 130 is received, the controller 150 enables the WiFi communication module 120 or the BT communication module 130. Alternatively, when an OOK modulation signal indicating a stop (e.g. disable) of the WiFi communication module 120 or the BT communication module 130 is received, the controller 150 disables the WiFi communication module 120 or the BT communication module 130.

Figure 7:
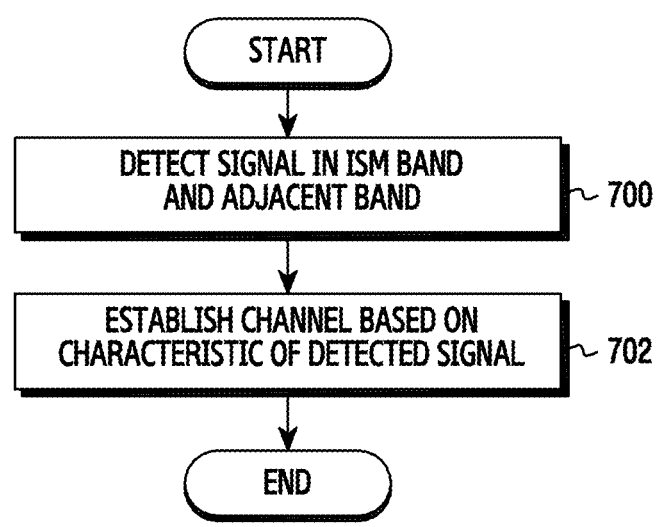
FIG. 7 is a flowchart of a method of a reception device according to an embodiment of the present disclosure.

FIG. 7 is a flowchart of a method of a reception device according to an embodiment of the present disclosure.

Referring to FIG. 7, the SRR communication module 140 detects signals in an ISM band and adjacent bands through the reception path (for example, a path that includes the LNA 300, the VCO 315, the quench circuit 320, the envelope detector 321, and the LPF 322) in step 700. For example, according to the predefined channel bandwidth and channel bandwidth interval mentioned in FIGS. 5A and 5B, a signal strength in the channel band may be successively detected.

The controller 150 establishes a channel for the WiFi communication module 120 or the BT communication module 130 based on the signal detected in the ISM band in step 702.

For example, like in the band allocation of FIG. 2, when a signal is detected in band 40 (for example, 3GPP TDD, 2300 MHz to 2400 MHz), the use of WiFi channels (for example, Channel 1 (CH1) to Channel 5 (CH5)) adjacent to band 40 is limited, thereby minimizing interference.

Alternatively, like in the band allocation of FIG. 2, when a signal is detected in band 7 and band 38 (for example, 2500 MHz to 2690 MHz), the use of WiFi channels (for example, Channel 11 (CH11) to Channel 14 (CH14)) adjacent to band 7 and band 38 is restricted, thereby minimizing interference.

According to an embodiment of the present disclosure, it is possible to limit on/off time of the WiFi communication module 120 or the BT communication module 130 by using a TDD configuration (see FIGS. 11A to 11C below).

According to an embodiment of the present disclosure, channels, which are not used among WiFi channels in an IMS band, may be searched for and allocated (see FIG. 9 below).

Figure 8:
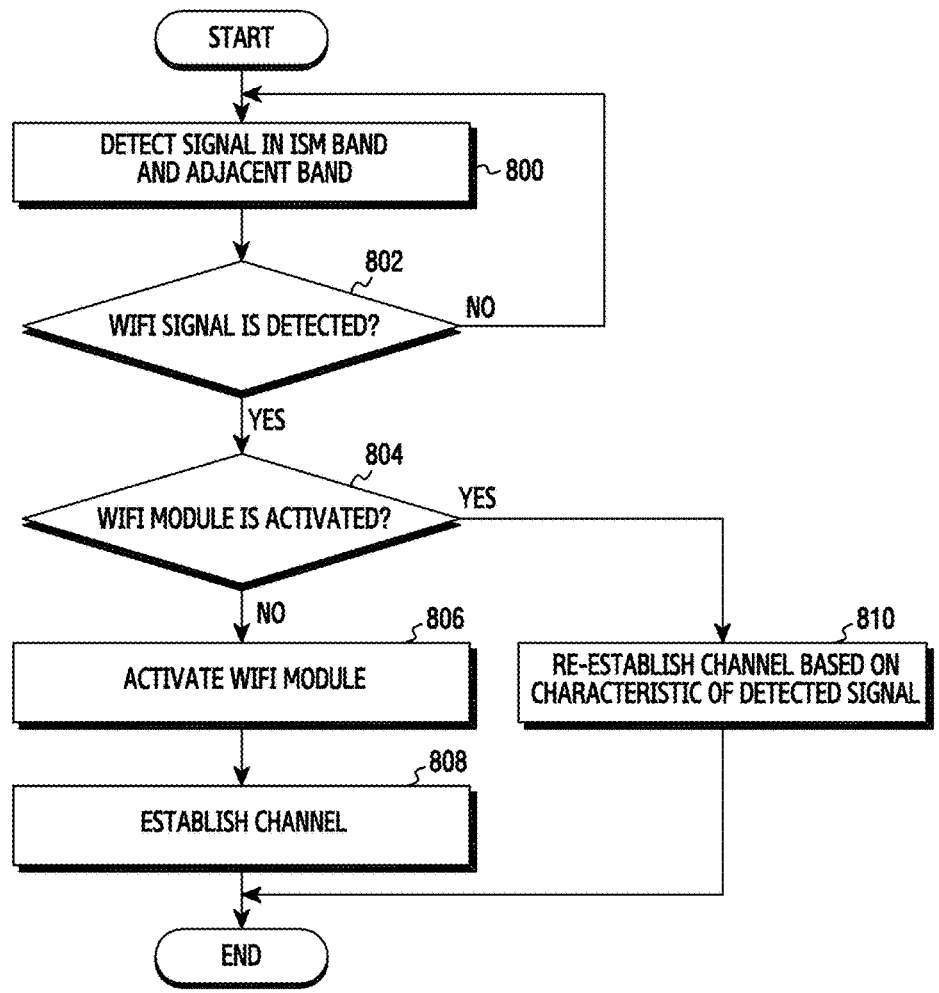
FIG. 8 is a flowchart of a method of a reception device according to an embodiment of the present disclosure.

FIG. 8 is a flowchart of a method of a reception device according to an embodiment of the present disclosure.

Referring to FIG. 8, the SRR communication module 140 detects signals in an ISM band and adjacent bands through the reception path (for example, a path that includes the LNA 300, the VCO 315, the quench circuit 320, the envelope detector 321, and the LPF 322) in step 800. For example, according to the predefined channel bandwidth and channel bandwidth interval mentioned in FIGS. 5A and 5B, a signal strength in the channel band may be successively detected.

When a WiFi signal (for example, a beacon signal of an AP) is detected in the ISM band in step 802, the controller 150 determines whether the WiFi communication module 120 is activated in step 804.

When the WiFi communication module 120 is not activated, the controller 150 activates the WiFi communication module 120 in step 806 and establishes a WiFi channel based on the detected signal in the ISM band in step 808. For example, a channel, which is not used, may be selected or the use of a channel, which receives/provides interference from/to an adjacent band, may be limited.

When the WiFi communication module 120 is activated, the controller 150 re-establishes a channel based on a detected signal characteristic in step 810. For example, a WiFi connection may be re-attempted using a channel having a good channel quality (for example, a channel having a high Signal-to-Noise Ratio (SNR)).

Figure 9:
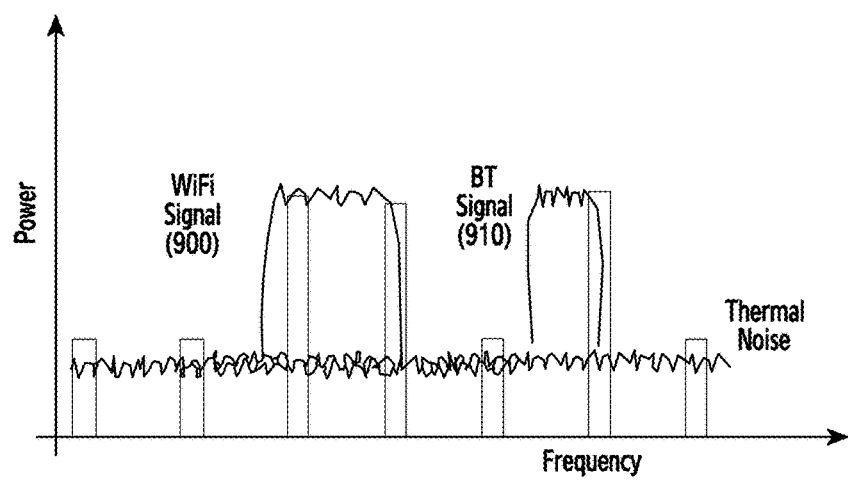
FIG. 9 is a graph of detecting a signal strength in an ISM band for channel establishment according to an embodiment of the present disclosure.

FIG. 9 is a graph of detecting strength of signals in an ISM band for channel establishment according to an embodiment of the present disclosure.

Referring to FIG. 9, in a case of Peer-to-Peer (P2P) WiFi (for example, WiFi direct or WiFi tethering) enabling a channel change or Adaptive Frequency Hopping (AFH) of BT, information on a channel which is being used (hereinafter, referred to as a busy channel) or a channel which is not being used (hereinafter, referred to as a clean channel) may be acquired through measurement of channel quality within an ISM band for a predetermined time. For example, a WiFi beacon signal in multiples of 100 msec is detected in a clean channel, and irregular signal strength is detected in a busy channel.

Accordingly, based on the above information, the clean channel may be mainly used. Data can be quickly transmitted through the clean channel which may provide a high SNR.

Figure 10:
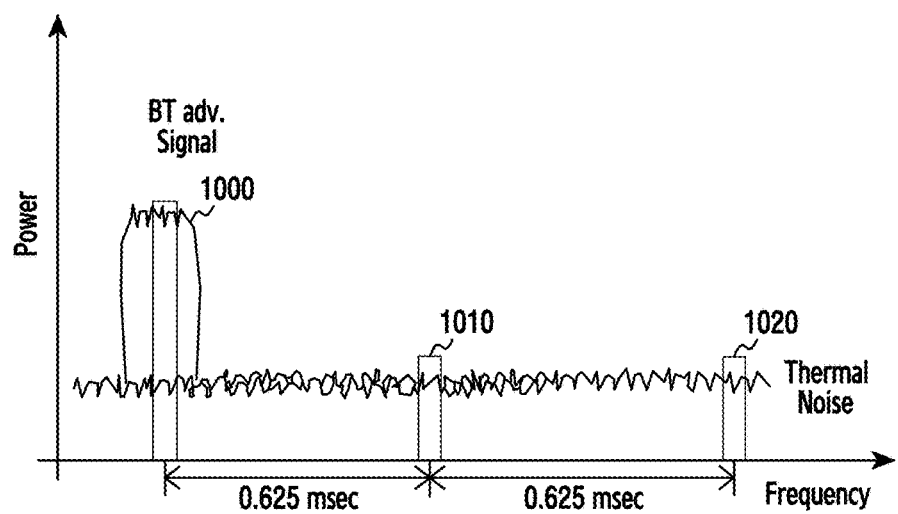
FIG. 10 is a graph of detecting a signal strength in an ISM band for channel establishment according to an embodiment of the present disclosure.

FIG. 10 is a graph of detecting a signal strength in an ISM band for channel establishment according to an embodiment of the present disclosure.

Referring to FIG. 10, the SRR communication module 140 detects a BT advertising signal while consuming a lower level of power as compared to the BT communication module 130. That is, the number of BT advertising channels is limited to three. By considering that intervals between the BT advertising signals are multiples of 0.625 msec, the BT advertising signal can be received while consuming a low level of power.

For example, when three BT advertising channels 1000, 1010, and 1020 are detected within an ISM band through the SRR communication module 140 and a signal is detected in the BT advertising channel 1000, the BT advertising signal may be received through the BT advertising channel 1000 by operating the BT communication module 130.

Figure 11A:
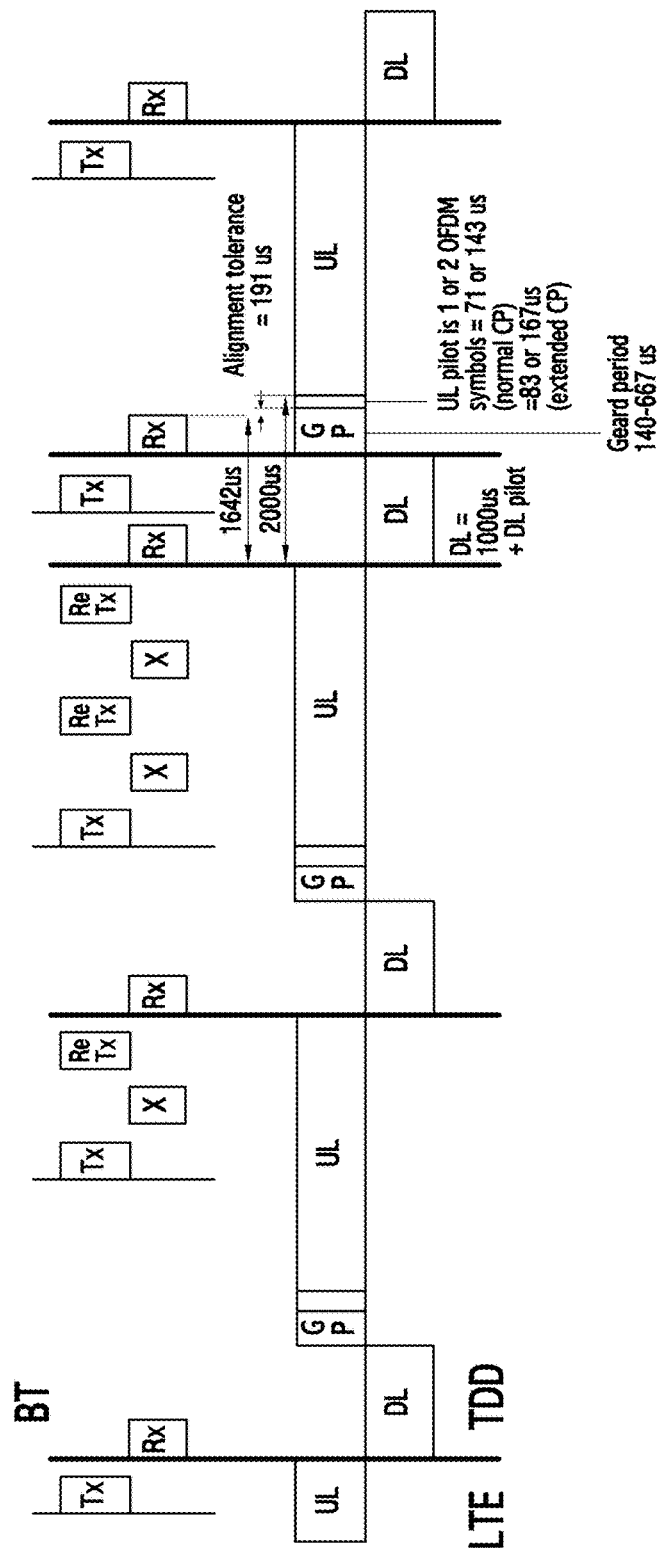
FIG. 11A illustrates timing alignment for minimizing interference due to a BT signal in an ISM band in a Long Term Evolution (LTE) Time Division Duplex (TDD) communication scheme according to an embodiment of the present disclosure.

FIG. 11A illustrates timing alignment for minimizing interference due to a BT signal in an ISM band in an LTE TDD communication scheme according to an embodiment of the present disclosure.

Referring to FIG. 11A, in the related art, when a UpLink (UL) signal is transmitted during an LTE communication, reception performance of an Rx signal of BT/WiFi deteriorates due to a larger signal, so that performance deterioration may occur. When a DownLink (DL) signal is transmitted during an LTE communication, transmission performance of a Tx signal of BT/WiFi deteriorates due to a larger signal, so that performance deterioration may occur.

However, an LTE TDD configuration may be recognized through real time signal strength detection. Accordingly, timing alignment with LTE TDD signals is made using the information, and reception timing of BT/WiFi signals is controlled using a current LTE TDD configuration. For example, a section of UL signal of LTE TDD, there is a Tx signal of BT and there is no Rx signal of BT. While a section of DL signal of LTE TDD, there is an Rx signal of BT and there is no Tx signal of BT. As a result, it is possible to minimize deterioration of reception performance.

Figure 11B:
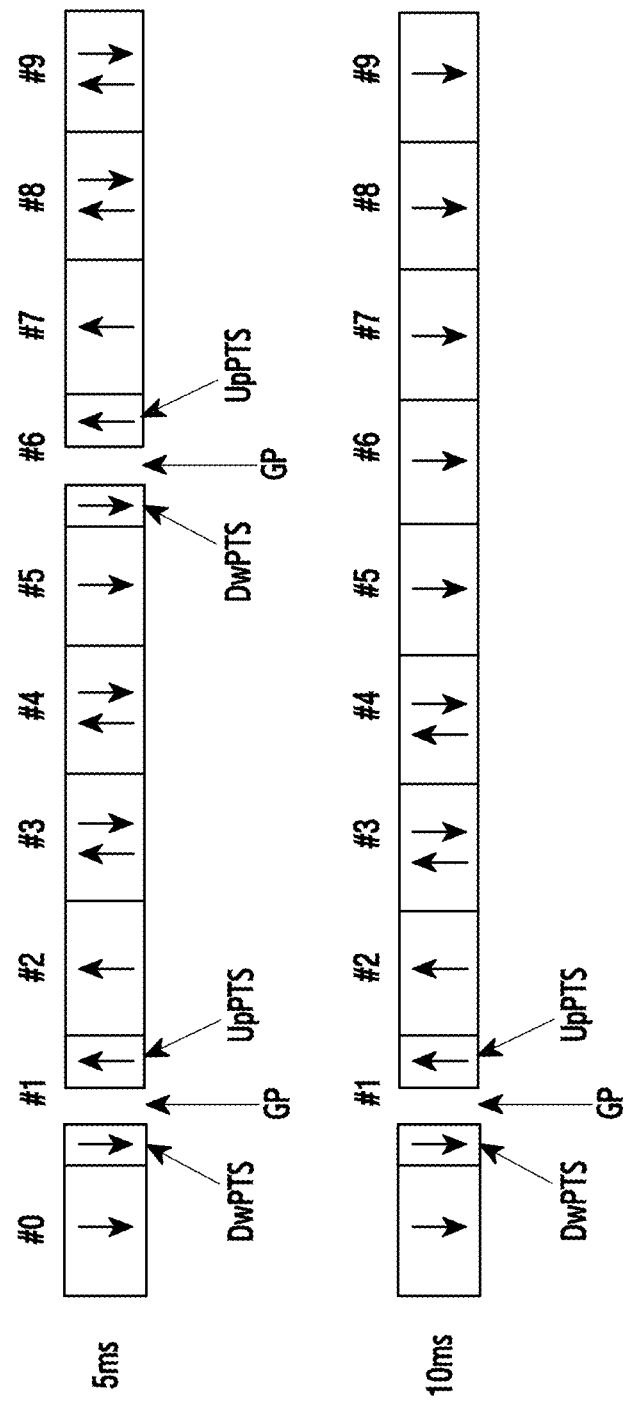
FIG. 11B illustrates frames of 5 ms and 10 ms in an LTE TDD communication scheme according to an embodiment of the present disclosure.

FIG. 11B illustrates frames of 5 ms and 10 ms in an LTE TDD communication scheme according to an embodiment of the present disclosure.

Referring to FIG. 11B, in the frame of 5 msec including 10 subframes, periodical switching is made in subframe #1 and subframe #6. Subframe #0 and subframe #5 are subframes for downlink, and subframe #2, subframe #3, subframe #4, subframe #7, subframe #8, and subframe #9 are subframes for uplink (e.g. TDD configuration #0). Subframe #3, subframe #4, subframe #8, and subframe #9 may be a downlink subframe or an uplink subframe, according to TDD configuration values #1, #2, and #6 as shown in FIG. 11C.

For example, in TDD configuration #1, subframe #3 is an uplink subframe, subframe #4 is a downlink subframe, subframe #8 is an uplink subframe and subframe #9 is a downlink subframe. In TDD configuration #2, subframe #3 is a downlink subframe, subframe #4 is a downlink subframe, subframe #8 is a downlink subframe and subframe #9 is a downlink subframe. In TDD configuration #6, subframe #3 is an uplink subframe, subframe #4 is an uplink subframe, subframe #8 is an uplink subframe and subframe #9 is a downlink subframe.

In the frame of 10 msec including 10 subframes, periodic switching is made in subframe #1. Subframe #2 is a subframe for uplink, and subframe #3 to subframe #9 are subframes for downlink (TDD configuration #5). Subframe #3 and subframe #4 may be downlink subframe or uplink subframe, according to TDD configuration value #3, #4, #5 as shown FIG. 11C. For example, in TDD configuration #2, subframe #3 is an uplink subframe and subframe #4 is an uplink subframe. In TDD configuration #4, subframe #3 is an uplink subframe and subframe #4 is a downlink subframe. In TDD configuration #5, subframe #3 is a downlink subframe and subframe #4 is a downlink subframe.

FIG. 11C is a chart showing an LTE TDD configuration according to an embodiment of the present disclosure.

Referring to FIG. 11C, a structure of frames corresponding to 7 TDD configurations is illustrated. "D" corresponds to downlink, "S" corresponds to switch, and "U" corresponds to uplink.

The methods according to embodiments of the present disclosure as defined by the appended claims, their equivalents, or disclosed herein may be implemented in the form of hardware, software, or any combination of hardware and software.

If implemented in software, a non-transitory computer-readable storage medium storing at least one program (e.g. a software module) may be provided. The at least one program stored in the non-transitory computer-readable storage medium is configured to be executable by one or more processors in an electronic device. The at least one program includes instructions that cause the electronic device to perform the methods according to an embodiment of the present disclosure as defined by the appended claims, their equivalents, and/or disclosed herein.

The programs (e.g. software modules or software) may be stored in non-volatile memories including a random access memory and a flash memory, a Read Only Memory (ROM), an Electrically Erasable Programmable Read Only Memory (EEPROM), a magnetic disc storage device, a Compact Disc-ROM (CD-ROM), Digital Versatile Discs (DVDs), other types of optical storage devices, or a magnetic cassette. Alternatively, any combination of some or all thereof may form a memory in which the program is stored. Further, a plurality of such memories may be included in an electronic device.

In addition, a program may be stored in an attachable storage device capable of accessing an electronic device through a communication network such as the Internet, an intranet, a Local Area Network (LAN), a Wireless LAN (WLAN), a Storage Area Network (SAN), or any combination thereof. Such a storage device may access an electronic device via an external port.

As described above, by monitoring signal strength in an ISM band through a low-power detector, the operation of the communication module efficiently using the ISM band can be turned on/off and channel establishment can be performed.

Further, by monitoring signal strength in an ISM band, it may be determined whether a communication scheme using the ISM band is received, thereby reducing power consumption of a WiFi communication module 120 which is in a standby state.

In addition, by sharing an oscillator included in a BT communication module 130 (or a WiFi communication module 120) with a low-power detector, the size of the communication module can be reduced.

While the present disclosure has been shown and described with reference to certain embodiments thereof, it will be understood by those skilled in the art that various changes in form and details may be made therein without departing from the scope of the present disclosure. Therefore, the scope of the present disclosure should not be defined as being limited to the embodiments of the present disclosure, but should be defined by the appended claims and equivalents thereof.

What is claimed is:

1. A transceiver, comprising:
a first communication module configured to receive a first signal based on a first communication scheme;
a second communication module configured to receive a second signal based on a second communication scheme;
a reception module having a low-power circuit configured to detect a signal in a frequency band being used by the first communication module and the second communication module; and
a controller configured to establish a channel which is identified among a plurality of channels for the first communication scheme or the second communication scheme based on a strength of the detected signal,
wherein a voltage controlled oscillator of the second communication module is shared with the reception module.

2. The transceiver of claim 1, wherein the reception module is a super regenerative receiver (SRR).

3. The transceiver of claim 1, wherein, when a signal is detected by the reception module in a band adjacent to the frequency band, the controller is further configured to limit a use of at least one channel for the first communication scheme, and
wherein the at least one channel is more adjacent to the band than other channels among the plurality of channels.

4. The transceiver of claim 1, wherein the controller is further configured to activate the first communication module or the second communication module based on the strength of the signal.

5. The transceiver of claim 1, wherein the first communication scheme is a wireless fidelity (WiFi) communication scheme and the second communication scheme is a bluetooth (BT) communication scheme, and
wherein the frequency band is an industrial scientific medical (ISM) band.

6. The transceiver of claim 1, wherein the second communication module comprises:
the VCO configured to generate an oscillation signal;
a mixer configured to combine the oscillation signal and the second signal to output a signal of an intermediate frequency (IF) band or a baseband;
a low pass filter (LPF) configured to filter a band of the output signal of the mixer; and
a variable gain amplifier (VGA) configured to amplify an output signal of the LPF by using a gain determined according to a size of the output signal of the LPF.

7. The transceiver of claim 1, wherein the reception module comprises:
the VCO shared with the second communication module, configured to generate an oscillation signal;
a quench circuit configured to control periodical occurrence and extinction of the oscillation signal of the VCO;
an envelope detector configured to detect an envelope of the controlled oscillation signal of the VCO; and
a low pass filter (LPF) configured to filter a band of the detected envelop,
wherein the detected signal in the frequency band is an output signal of the LPF.

8. The transceiver of claim 1, wherein the first communication module comprises:
a voltage controlled oscillator (VCO) configured to generate an oscillation signal;
a mixer configured to combine the oscillation signal and the first signal to output a signal of an intermediate frequency (IF) band or a baseband;
a low pass filter (LPF) configured to filter a band of the output signal of the mixer; and
a variable gain amplifier (VGA) configured to amplify an output signal of the LPF by using a gain determined according to a size of the output signal of the LPF.

9. The transceiver of claim 1, further comprising a low-noise amplifier (LNA) electrically connected to at least one of the first communication module, the second communication module, and the reception module.

10. A method of operating a transceiver, the method comprising:
detecting a signal in a frequency band being used by a first communication module for a first communication scheme and a second communication module for a second communication scheme, by a reception module; and
establishing a channel which is identified among a plurality of channels for the first communication scheme or the second communication scheme based on a strength of the detected signal,
wherein a voltage controlled oscillator (VCO) of the second communication module is shared with the reception module.

11. The method of claim 10, further comprising, when a signal is detected in a band adjacent to the frequency band by the reception module, limiting a use of at least one channel for the first communication scheme or the second communication scheme,
wherein the at least one channel is more adjacent to the band that other channels among the plurality of channels.

12. The method of claim 10, wherein establishing the channel comprises:
determining whether at least one channel among the plurality of channels is used based on the detected signal; and
identifying the channel from one or more channels which are not used,
wherein a low noise amplifier (LNA) of the first communication module is shared with the reception module and the second communication module.

13. The method of claim 10, wherein establishing the channels comprises:
activating the second communication module when a signal is detected in at least one advertising channel of the second communication scheme; and
receiving the detected signal of the at least one advertising channel through the second communication module,
wherein the frequency band is an industrial scientific medical (ISM) band,
wherein the first communication module is a wireless fidelity (WiFi) communication module,
wherein the second communication module is a bluetooth (BT) communication module, and
wherein the reception module is a super regenerative receiver (SRR).

14. The method of claim 10, wherein detecting the signal in the frequency band comprises:
generating an oscillation signal by using the VCO shared with the second communication module;
controlling periodical occurrence and extinction of the oscillation signal of the VCO;
detecting an envelope of the controlled oscillation signal of the VCO;

filtering a band of the detected envelope; and detecting an output signal of the LPF as the signal in the frequency band.

15. A transceiver chip set, comprising a chip set configured to:

detect a signal in a frequency band being used by a first communication module for a first communication scheme and a second communication module for a second communication scheme, by a reception module; and establish a channel which is identified among a plurality of channels for the first communication scheme or the second communication scheme based on a strength of the detected signal, wherein a voltage controlled oscillator (VCO) of the second communication module is shared with the reception module.

16. The transceiver chip set of claim 15, wherein the frequency band is an industrial scientific medical (ISM) band, wherein the first communication module is a wireless fidelity (WiFi) communication module, wherein the second communication module is a bluetooth (BT) communication module, and wherein the reception module is a super regenerative receiver (SRR).

17. The transceiver chip set of claim 15, wherein the chipset is further configured to, when a signal is detected in a band adjacent to the frequency band by the reception module limit a use of at least one channel for the first communication scheme or the second communication scheme, wherein the at least one channel is more adjacent to the band that other channels among the plurality of channels.

18. The transceiver chip set of claim 15, wherein the chipset, to establish the channel, is configured to:

determine whether at least one channel among the plurality of channels is used based on the detected signal; and identify the channel from one or more channels which are not used, wherein a low noise amplifier (LNA) of the first communication module is shared with the reception module and the second communication module.

19. The transceiver chip set of claim 15, wherein the chipset, to establishing the channel, is configured to:

activate the second communication module when a signal is detected in at least one advertising channel of the second communication scheme; and receive the detected signal of the at least one advertising channel through the second communication module.

20. The transceiver chip set of claim 15, wherein the chip set, to detect the signal in the frequency band, is configured to:

generate an oscillation signal by using the VCO shared with the second communication module;

control periodical occurrence and extinction of the oscillation signal of the VCO;

detect an envelope of the controlled oscillation signal of the VCO;

filter a band of the detected envelope; and detect an output signal of the LPF as the signal in the frequency band.

* * * * *